(12) United States Patent
Wang

(10) Patent No.: US 8,576,383 B2
(45) Date of Patent: Nov. 5, 2013

(54) AUTOMATIC LASER RANGEFINDER AND METHOD OF AUTOMATICALLY ACTIVATING THE LASER RANGEFINDER TO MEASURE DISTANCE

(75) Inventor: Jung-Ching Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 291 days.

(21) Appl. No.: 13/101,468

(22) Filed: May 5, 2011

(65) Prior Publication Data

US 2012/0113407 A1     May 10, 2012

(30) Foreign Application Priority Data

Nov. 4, 2010   (TW) ................. 99138008 A

(51) Int. Cl.
*G01C 3/08*     (2006.01)
(52) U.S. Cl.
USPC ............. 356/4.01; 356/3.01; 356/4.02
(58) Field of Classification Search
USPC ................ 356/3.01, 4.01, 4.02
See application file for complete search history.

(56) References Cited

FOREIGN PATENT DOCUMENTS

| TW | 200938800 | 3/1997 |
| TW | 200919255 | 9/1997 |

OTHER PUBLICATIONS

Abstract of Taiwan Patent No. 200919255.
Abstract of Taiwan Patent No. 200938800.
Translation of Abstract of Taiwan Patent No. 200919255 and No. 200938800.

*Primary Examiner* — Isam Alsomiri
*Assistant Examiner* — Samantha K Abraham
(74) *Attorney, Agent, or Firm* — Tracy Heims; Apex Juris, pllc

(57) ABSTRACT

The present invention provides a laser rangefinder and a method of activating the laser rangefinder to measure distance. The laser rangefinder has a first sensing to sense whether the user is aiming the laser rangefinder at a target and a second sensing device to sense an acceleration of the laser rangefinder and the acceleration has to be smaller than a preset value. The laser rangefinder will be automatically activated to measure distance when both of the first sensing device and the second device are checked.

12 Claims, 8 Drawing Sheets

AUTOMATIC LASER RANGEFINDER AND METHOD OF AUTOMATICALLY ACTIVATING THE LASER RANGEFINDER TO MEASURE DISTANCE

CROSS-REFERENCES TO RELATED APPLICATIONS

This non-provisional application claims priority under 35 U.S.C. §119(a) to Patent Application No(s). 099138008 filed in Taiwan, R.O.C. on Nov. 4, 2010, the entire contents of which are hereby incorporated by reference.

BACKGROUND OF THE INVENTION

1. Field of the Invention

The present invention relates generally to a rangefinder, and more particularly to a laser rangefinder, which may automatically activate the measuring function, and a method of automatically activating the laser rangefinder to measure distance.

2. Description of the Related Art

In a conventional laser rangefinder, there is a switch on a case to manually turn on or turn off the laser rangefinder. To measure a target at far away, it would cause a big error in distance measurement when user presses the switch and causes the laser rangefinder shifting. Some guns are mounted with a laser rangefinder for aiming target and measuring distance. Shooter has to turn on the laser rangefinder before shooting. It is difficult for shooter with small palm to reach the switch of the laser rangefinder and that will affect shooting.

To overcome above drawbacks, an improved laser rangefinder is provided with a remoter to turn on or turn off the laser rangefinder by operating the remoter. It may avoid shifting the laser rangefinder when turns on the laser rangefinder and help the shooter to turn on or turn off the laser rangefinder on the gun in spite of his/her body size. However, when the user operates the remoter, he/she will move anyway and that may affect distance measurement or shooting. Besides, user has to hold the remoter in hand and that is inconvenient.

In conclusion, the conventional laser rangefinders still have some problems to be overcome.

SUMMARY OF THE INVENTION

The primary objective of the present invention is to provide a laser rangefinder and a method of automatically activating the laser rangefinder, which may automatically activate the laser rangefinder to measure distance.

According to the objective of the present invention, a method of automatically activating a laser rangefinder, wherein the laser rangefinder has a case and an aiming window on the case for a user aiming the laser rangefinder at a target, includes the steps of: sensing (1) whether the user's eye is close to the aiming window, and (2) an acceleration of the case; and activating the laser rangefinder when the user's eye is close to the aiming window, and the acceleration of the case is smaller than a preset value.

In an embodiment, the laser rangefinder includes a case, a first sensing device, a second sensing device, processor a measuring device, and a display device. The case has an aiming window for a user aiming the laser rangefinder at a target. The first sensing device senses whether the user's eye is close to the aiming window and generate a first signal when senses the user's eye is close to the aiming window. The second senses device sensing an acceleration of the case. The processor generates a second signal when the acceleration sensed by the second sensing device is smaller than a preset value. The measuring device emits a laser ray to the target to measure a distance between the target and the laser rangefinder when the measuring device receives both of the first signal and the second signal. The display device shows a result of measurement of the measuring device.

In an embodiment, the first signal of the first sensing device is transmitted to the processor, and the processor generates a second signal when the acceleration sensed by the second sensing device is smaller than a preset value. The measuring device is activated for measurement when it receives the second signal from the processor.

In a preferred embodiment, the second sensing device is activated when the first sensing device senses the user's eye is close to the aiming window, and then the processor generates the second signal when the acceleration sensed by the second sensing device is smaller than the preset value to activate the measuring device.

In a preferred embodiment, first sensing device is activated when the processor receives the acceleration sensed by the second sensing device and the acceleration is smaller than the preset value, and then the first sensing device generates a first signal and transmits it to the measuring device to activate it when the first sensing device senses the user's eye close to the aiming window.

DETAILED DESCRIPTION OF THE INVENTION

Figure 1:
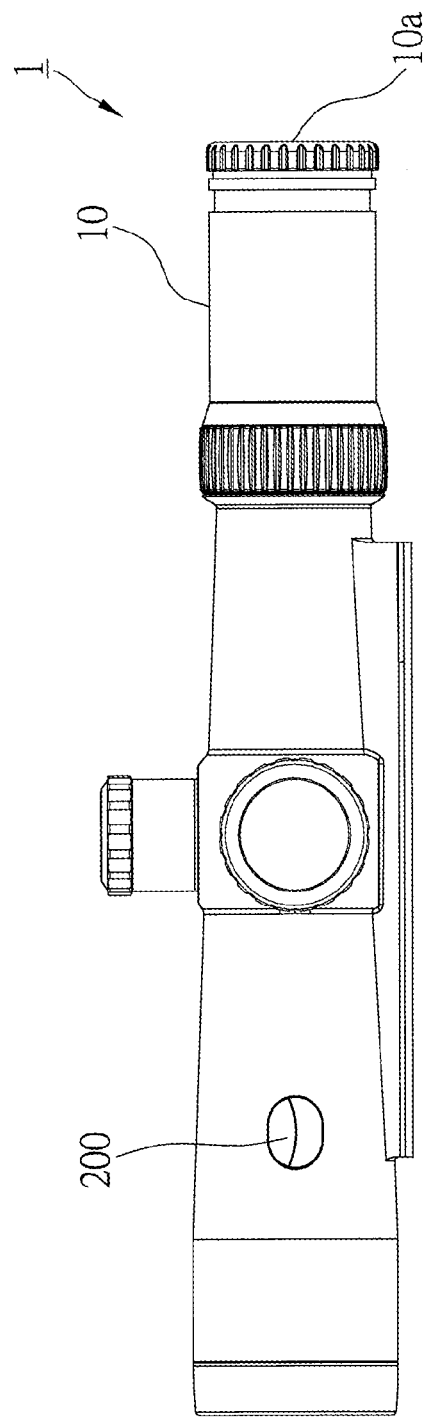
FIG. 1 is a lateral view of a first preferred embodiment of the present invention.
Figure 2:
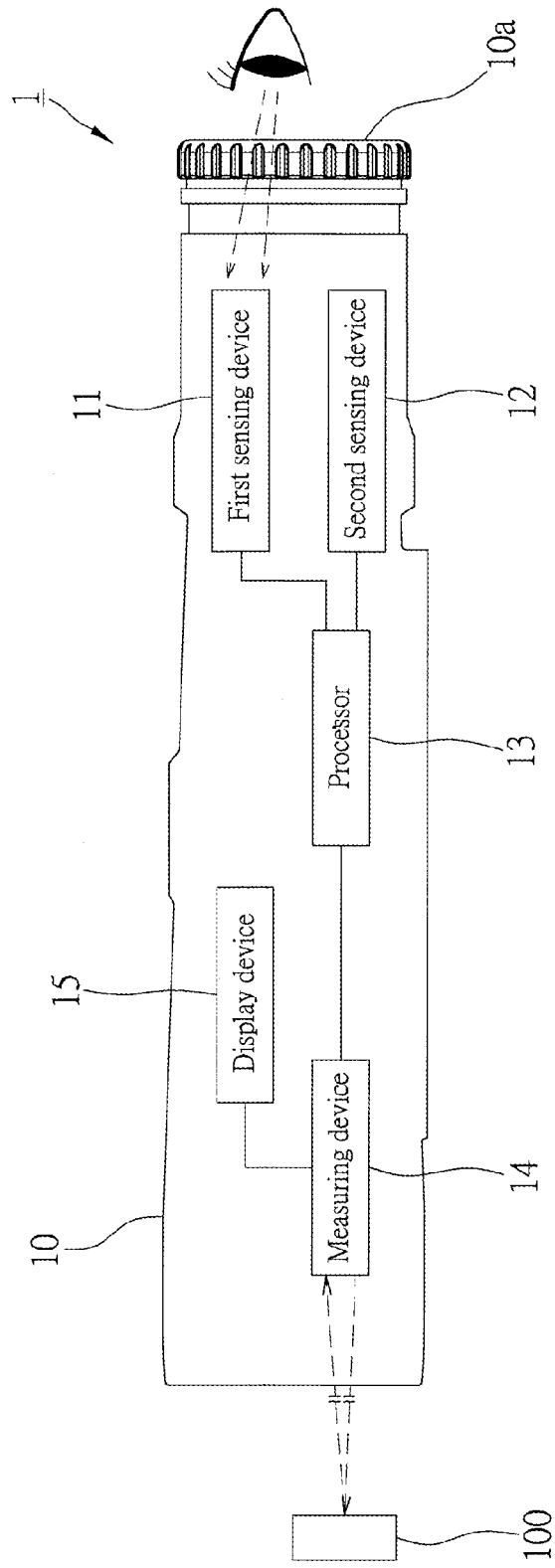
FIG. 2 is a block diagram of the first preferred embodiment of the present invention.
Figure 3:
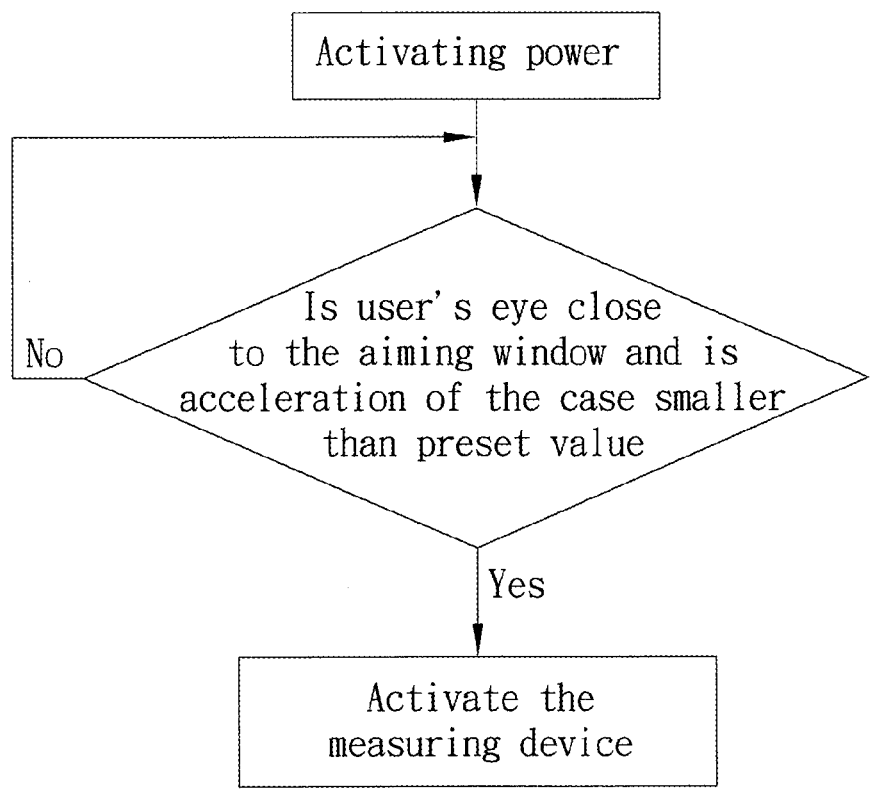
FIG. 3 is a flow chart of the first preferred embodiment of the present invention.

The first preferred embodiment of present invention provides a laser rangefinder 1 and a method of automatically turning on the laser rangefinder 1. FIG. 1 and FIG. 2 show a structure of the laser rangefinder 1 and FIG. 3 shows the procedures of automatically turning on the laser rangefinder 1.

The laser rangefinder 1 of the first preferred embodiment of present invention includes a case 10, in which a first sensing device 11, a second sensing unit 12, a processor 13, a measuring device 14, and a display device 15 are provided.

The case 10, which may be held by user or mounted on a gun, has an aiming window 10a for user looking through the aiming window 10a to aim the laser rangefinder 1 at an target 100.

The first sensing device 11 is nearby the aiming window 10a to sense user's eye. In the first preferred embodiment, the first sensing device 11 is an infrared sensor to sense infrared rays emitted from human's eye to identify whether the user is aiming the target 100 through the aiming window 10a. When the first sensing device 11 senses infrared rays, it means user is going to measure the target 100 and the first sensing device 11 generates a first signal. The first sensing device 11 may be a rangefinder also to measure a distance between user's eye and the aiming window 10a that the first sensing device 11 will generate the first signal when user's eye is close to the aiming window 10a. The third option of the first sensing device 11 is an optical sensor to sense luminosity in front of the aiming window 10a. It will become darker when user's eye approaches the aiming window 10a and the optical sensor may senses the luminosity change. The first sensing device 11 also may be an image recognition device to detect whether an eye is approaching the aiming window 10a.

The second sensing device 12 senses an acceleration of the case 10. In the present invention, the second sensing device 12 may be a three-dimension accelerometer or a gyroscope to measure acceleration or angle variation.

The processor 13 is electrically connected to the first sensing device 11 and the second sensing device 12. The processor 13 is stored with a preset acceleration value to be compared with an acceleration sensed by the second sensing device 12. When the processor 13 receives the first signal from the first sensing device 11, and the acceleration sensed by the second sensing device 12 is smaller than the preset acceleration value, it means the user is aiming the laser rangefinder 1 at the target 100 and the case 10 is kept in a stable condition the processor 13 that the laser rangefinder 1 is ready to measure the target 100. At this moment, the processor 13 generates a second value.

The measuring device 14 is electrically connected to the processor 13 that the measuring device 14 is activated when the measuring device 14 receives the second signal from the processor 13. The measuring device 14 emits a laser ray to the target 100 and receives the reflection from the target 100 to calculate a distance between the laser rangefinder 1 and the target 100. The measuring device 14 is a conventional device, so we do not describe the detail here.

The display device 19 is a transmissive LCD in the present invention and is electrically connected to the measuring device 14 to show the measurement result.

Figure 4:
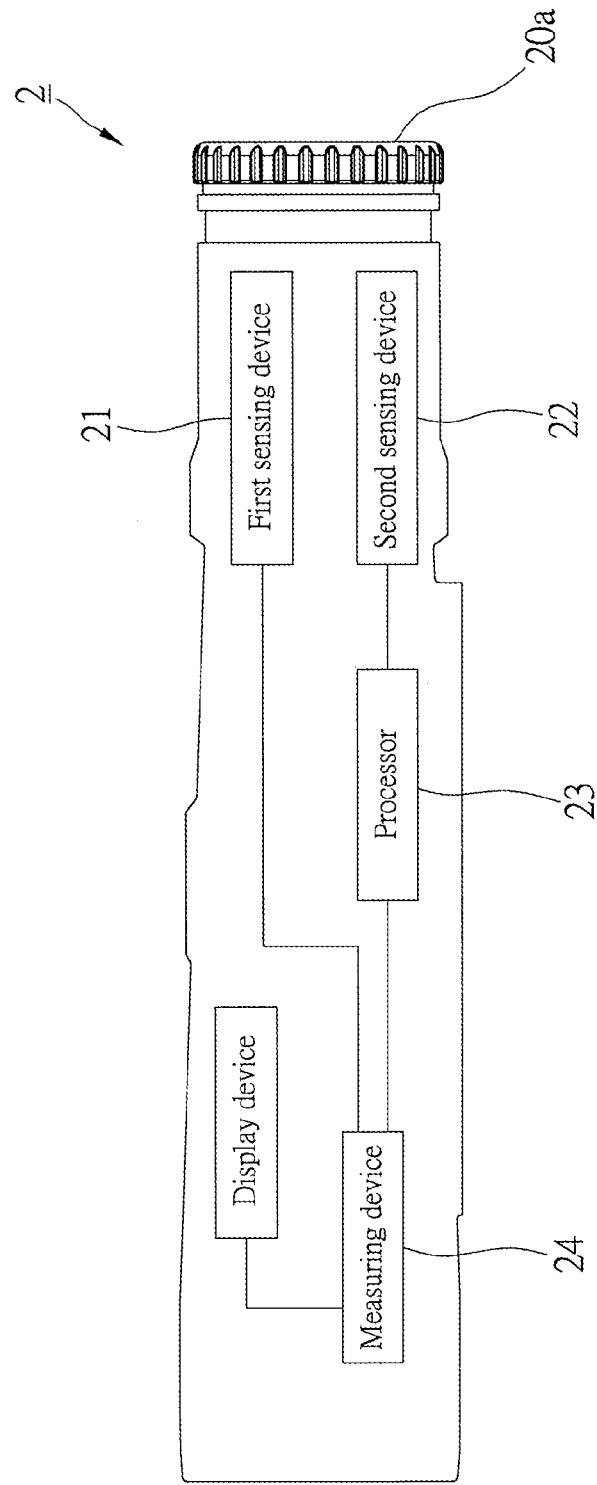
FIG. 4 is a block diagram of a second preferred embodiment of the present invention.

As shown in FIG. 4, a laser rangefinder 2 of the second preferred embodiment of the present invention, which is similar to the laser rangefinder 1 of the first preferred embodiment, except that a first sensing device 21 is electrically connected to a measuring device 24, and a sensing device 22 is electrically connected to a processor 23. The measuring device 24 is activated by both of the first sensing device 21 and the processor 23.

Figure 5:
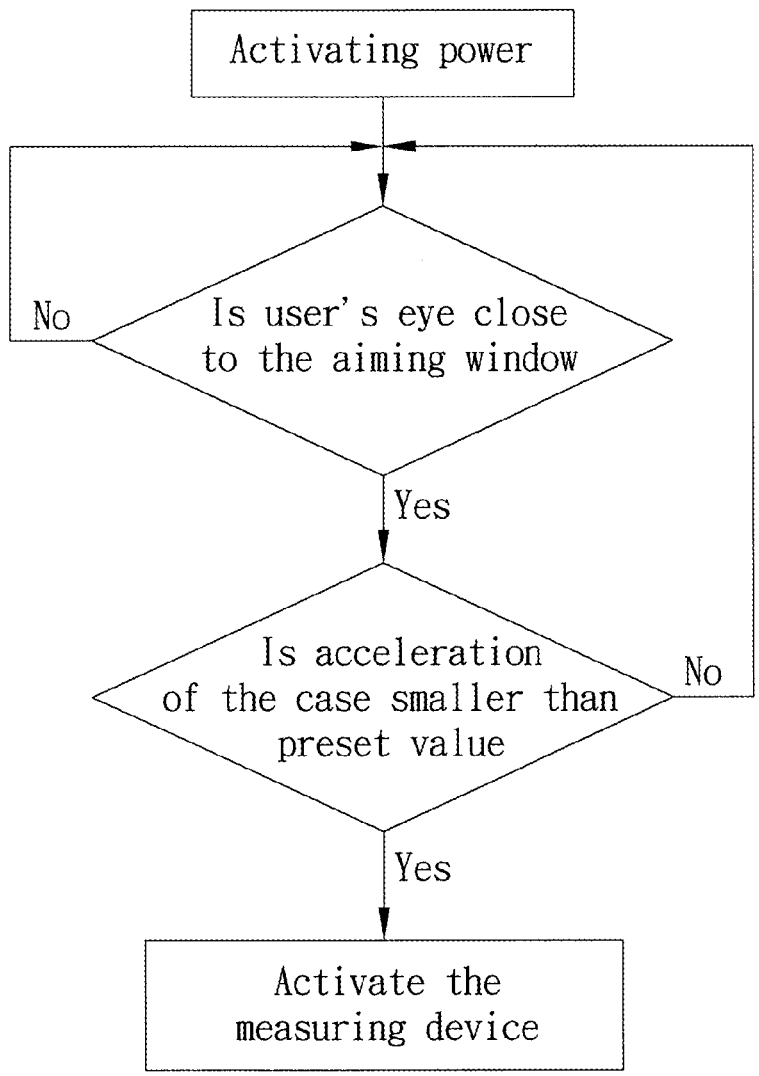
FIG. 5 is a flow chart of a third preferred embodiment of the present invention.
Figure 6:
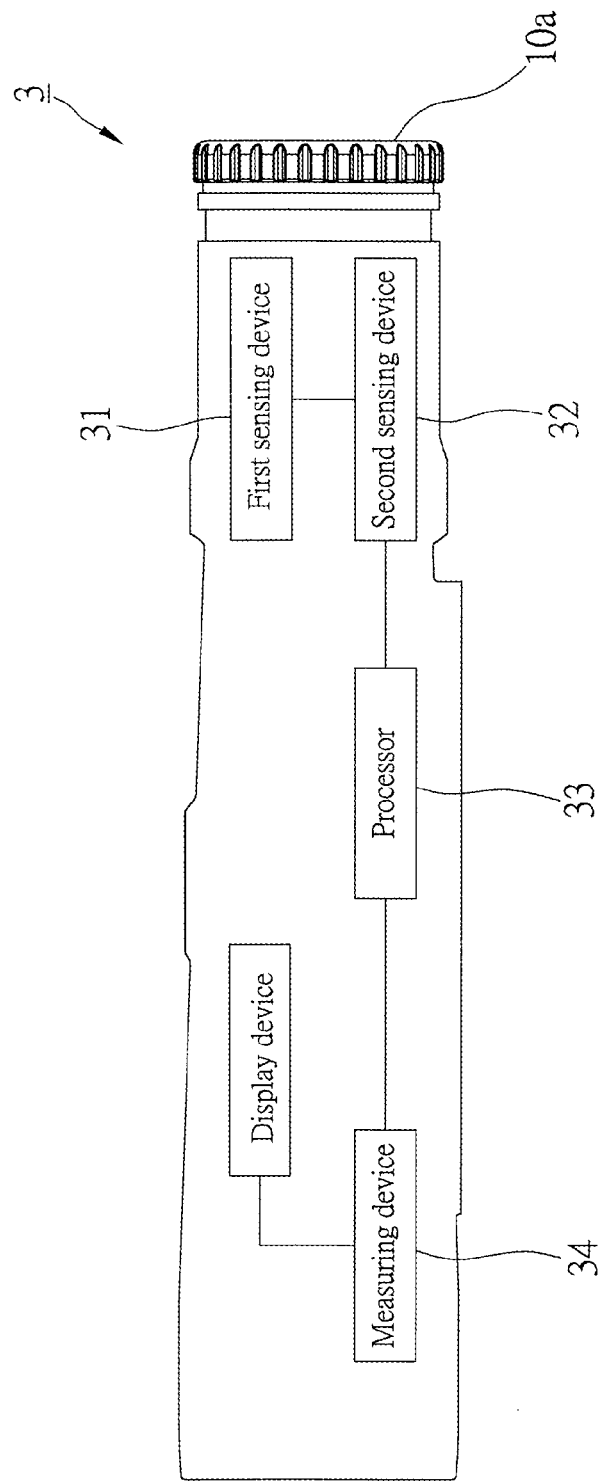
FIG. 6 is a block diagram of the third preferred embodiment of the present invention.

FIG. 5 and FIG. 6 show a laser rangefinder 3 of the third preferred embodiment of the present invention. The laser rangefinder 3 detects the eye of user at the position of aiming first and then detects the acceleration, and the laser rangefinder 3 is activated to measure the distance when both of above are checked. As shown in FIG. 6, the laser rangefinder 3 includes a first sensing device 31, a second sensing device 32 is electrically connected to the first sensing device 31, a processor 33 is electrically connected to the second sensing device 32, and a measuring device 34 is electrically connected to the processor 33. The second sensing device 32 is activated when the first sensing device 31 is checked, and the processor 33 activates the measuring device 34 when the second sensing device 32 is checked.

Figure 7:
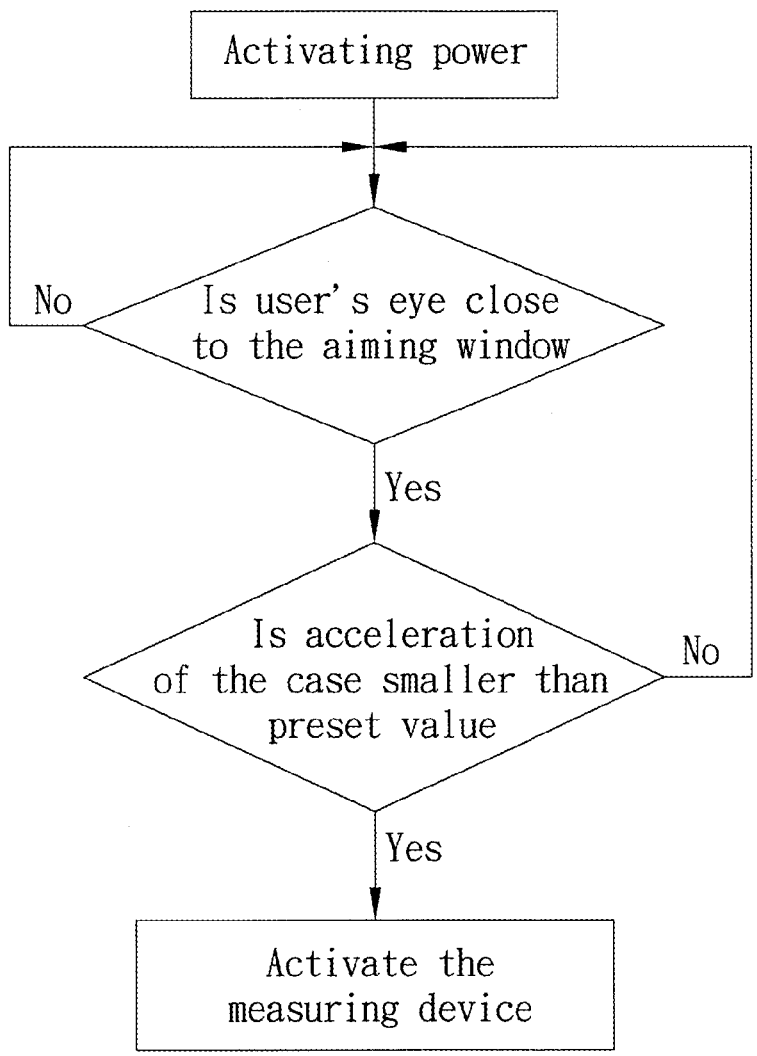
FIG. 7 is a flow chart of a fourth preferred embodiment of the present invention.
Figure 8:
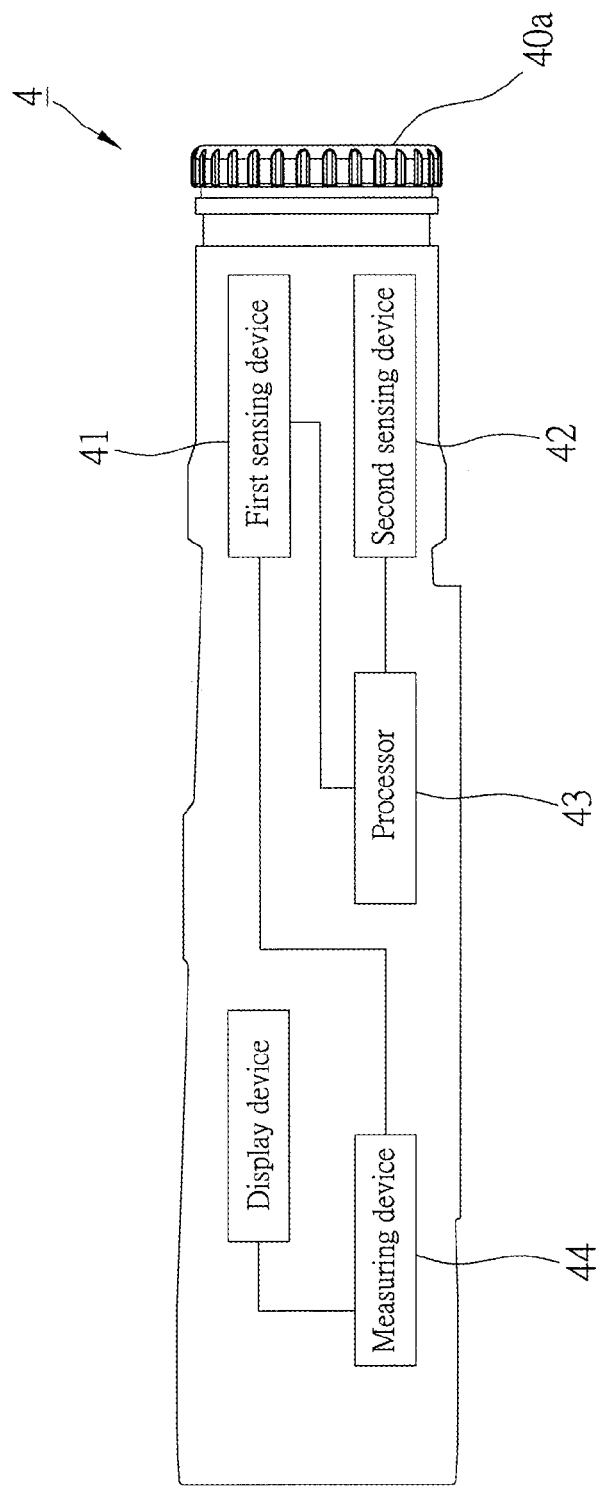
FIG. 8 is a block diagram of the fourth preferred embodiment of the present invention.

FIG. 7 and FIG. 8 show a laser rangefinder 4 of the fourth preferred embodiment of the present invention. The laser rangefinder 4 detects the acceleration first and then detects the eye of user at the position of aiming, and the laser rangefinder 3 is activated to measure the distance when both of above are checked. As shown in FIG. 8, the laser rangefinder 4 includes a first sensing device 41, a second sensing device 42 is electrically connected to the first sensing device 41, a processor 43 is electrically connected to the first sensing device 41, and a measuring device 44 is electrically connected to the processor 43. The first sensing device 41 is activated when the second sensing device 42 is checked, and the processor 43 activates the measuring device 44 when the first sensing device 41 is checked.

It is noted that the laser rangefinder of the present invention may be provided with a start button 200, as shown in FIG. 1, that user may directly activate the measuring device by pressing the start button 200 in spite of the first and second sensing devices for various operation modes or users of the laser rangefinder of the present invention.

The description above is a few preferred embodiments of the present invention and the equivalence of the present invention is still in the scope of claim construction of the present invention.

What is claimed is:

1. A method of automatically activating a laser rangefinder, wherein the laser rangefinder has a case and an aiming window on the case for a user aiming the laser rangefinder at a target, comprising the steps of:
   (a). sensing (1) whether the user's eye is close to the aiming window, and (2) an acceleration of the case; and
   (b). activating the laser rangefinder when the user's eye is close to the aiming window, and the acceleration of the case is smaller than a preset value.

2. The method as defined in claim 1, further comprising the step of emitting a ray to a front of the aiming window to measure a distance between the eye and the aiming window to determine whether the user's eye is close to the aiming window in the item (1) of the step (a).

3. The method as defined in claim 1, further comprising the step of sensing infrared rays of the eye to determine whether the user's eye is close to the aiming window in the item (1) of the step (a).

4. The method as defined in claim 1, further comprising the step of sensing luminosity in front of the aiming window to determine whether the user's eye is close to the aiming window in the item (1) of the step (a).

5. The method as defined in claim 4, further comprising the step of capturing an image in front of the aiming window and identifying whether an eye is in the image to determine whether the user's eye is close to the aiming window in the item (1) of the step (a).

6. The method as defined in claim 1, wherein the item (1) and the item (2) of the step (a) are performed at the same time.

7. The method as defined in claim 1, wherein the item (1) of the step (a) is performed first, and then the item (2) of the step (a) is performed when the item (1) is checked.

8. The method as defined in claim 1, wherein the item (2) of the step (a) is performed first, and then the item (1) of the step (a) is performed when the item (2) is checked.

9. A laser rangefinder, comprising:
   a case having an aiming window for a user aiming the laser rangefinder at a target;
   a first sensing device sensing whether the user's eye is close to the aiming window and generating a first signal when senses the user's eye is close to the aiming window;
   a second sensing device sensing an acceleration of the case;
   a processor generating a second signal when the acceleration sensed by the second sensing device is smaller than a preset value;

a measuring device emitting a laser ray to the target to measure a distance between the target and the laser rangefinder when the measuring device receives both of the first signal and the second signal; and a display device showing a result of measurement of the measuring device.

10. A laser rangefinder, comprising:

a case having an aiming window for a user aiming the laser rangefinder at a target;

a first sensing device sensing whether the user's eye is close to the aiming window and generating a first signal when senses the user's eye is close to the aiming window;

a second sensing device sensing an acceleration of the case;

a processor generating a second signal when the acceleration sensed by the second sensing device is smaller than a preset value and the processor receives the first signal from the first sensing device;

a measuring device emitting a laser ray to the target to measure a distance between the target and the laser rangefinder when the measuring device receives the second signal from the processor; and a display device showing a result of measurement of the measuring device.

11. A laser rangefinder, comprising:

a case having an aiming window for a user aiming the laser rangefinder at a target;

a first sensing device sensing whether the user's eye is close to the aiming window and generating a first signal when senses the user's eye is close to the aiming window;

a second sensing device sensing an acceleration of the case when receives the first signal from the first sensing device;

a processor generating a second signal when the acceleration sensed by the second sensing device is smaller than a preset value;

a measuring device emitting a laser ray when the measuring device receives the second signal from the processor; and a display device showing a result of measurement of the measuring device.

12. A laser rangefinder, comprising:

a case having an aiming window for a user aiming the laser rangefinder at a target;

a first sensing device sensing whether the user's eye is close to the aiming window and generating a first signal when senses the user's eye is close to the aiming window;

a second sensing device sensing an acceleration of the case;

a processor generating a second signal to activate the first sensing device when the acceleration sensed by the second sensing device is smaller than a preset value;

a measuring device emitting a laser ray when the measuring device receives the first signal from the first sensing device; and a display device showing a result of measurement of the measuring device.

* * * * *